United States Patent
Yost

(10) Patent No.: US 10,216,414 B2
(45) Date of Patent: *Feb. 26, 2019

(54) FRAME CHOOSING DURING STORAGE CONSTRAINT CONDITION

(71) Applicant: International Business Machines Corporation, Armonk, NY (US)

(72) Inventor: Christine M. Yost, Hopewell Jct., NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,982

(22) Filed: Sep. 15, 2017

(65) Prior Publication Data

US 2017/0371550 A1  Dec. 28, 2017

Related U.S. Application Data

(63) Continuation of application No. 15/457,199, filed on Mar. 13, 2017, now Pat. No. 9,785,346, which is a continuation of application No. 15/085,484, filed on Mar. 30, 2016, now Pat. No. 9,600,198, which is a
(Continued)

(51) Int. Cl.
| | |
|---|---|
| *G06F 3/06* | (2006.01) |
| *G06F 12/00* | (2006.01) |
| *G06F 12/109* | (2016.01) |
| *G06F 11/34* | (2006.01) |
| *G06F 17/30* | (2006.01) |
| *G06F 9/50* | (2006.01) |

(52) U.S. Cl.
CPC ............ *G06F 3/0604* (2013.01); *G06F 3/064* (2013.01); *G06F 3/0608* (2013.01); *G06F 3/0613* (2013.01); *G06F 3/0629* (2013.01); *G06F 3/0631* (2013.01); *G06F 3/0644* (2013.01); *G06F 3/0653* (2013.01); *G06F 3/0665* (2013.01); *G06F 3/0673* (2013.01); *G06F 3/0674* (2013.01); *G06F 3/0685* (2013.01); *G06F 9/5016* (2013.01); *G06F 11/3409* (2013.01); *G06F 12/00* (2013.01); *G06F 12/109* (2013.01); *G06F 17/30312* (2013.01); *G06F 2201/81* (2013.01); *G06F 2201/815* (2013.01)

(58) Field of Classification Search
CPC .... G06F 3/0604; G06F 3/0644; G06F 3/0673; G06F 3/0629
See application file for complete search history.

(56) References Cited

U.S. PATENT DOCUMENTS

| | | |
|---|---|---|
| 8,135,263 B2 | 3/2012 | Yogeshwar et al. |
| 8,140,548 B2 | 3/2012 | Bruno et al. |
| 8,799,611 B2 | 8/2014 | Foster et al. |

(Continued)

*Primary Examiner* — Christopher D Birkhimer
(74) *Attorney, Agent, or Firm* — Cantor Colburn LLP; William A. Kinnaman, Jr.

(57) ABSTRACT

A method for frame choosing in a computing system during a storage constraint condition is provided. The method includes calculating, with a processor, a use-grouped-threshold, comparing a number of available grouped frames to the calculated use-grouped-threshold, returning a decision to use a grouped frame in an event that the number of the available grouped frames exceeds the calculated use-grouped-threshold and returning a decision to use an above-the-bar frame in an event that the number of the available grouped frames is less than or equal to the calculated use-grouped-threshold.

1 Claim, 5 Drawing Sheets

Related U.S. Application Data continuation of application No. 14/638,354, filed on Mar. 4, 2015, now Pat. No. 9,612,764.

(56) References Cited

U.S. PATENT DOCUMENTS

| | | |
|---|---|---|
| 8,947,502 B2 | 2/2015 | Mashiah |
| 2014/0201496 A1 | 7/2014 | Foster et al. |

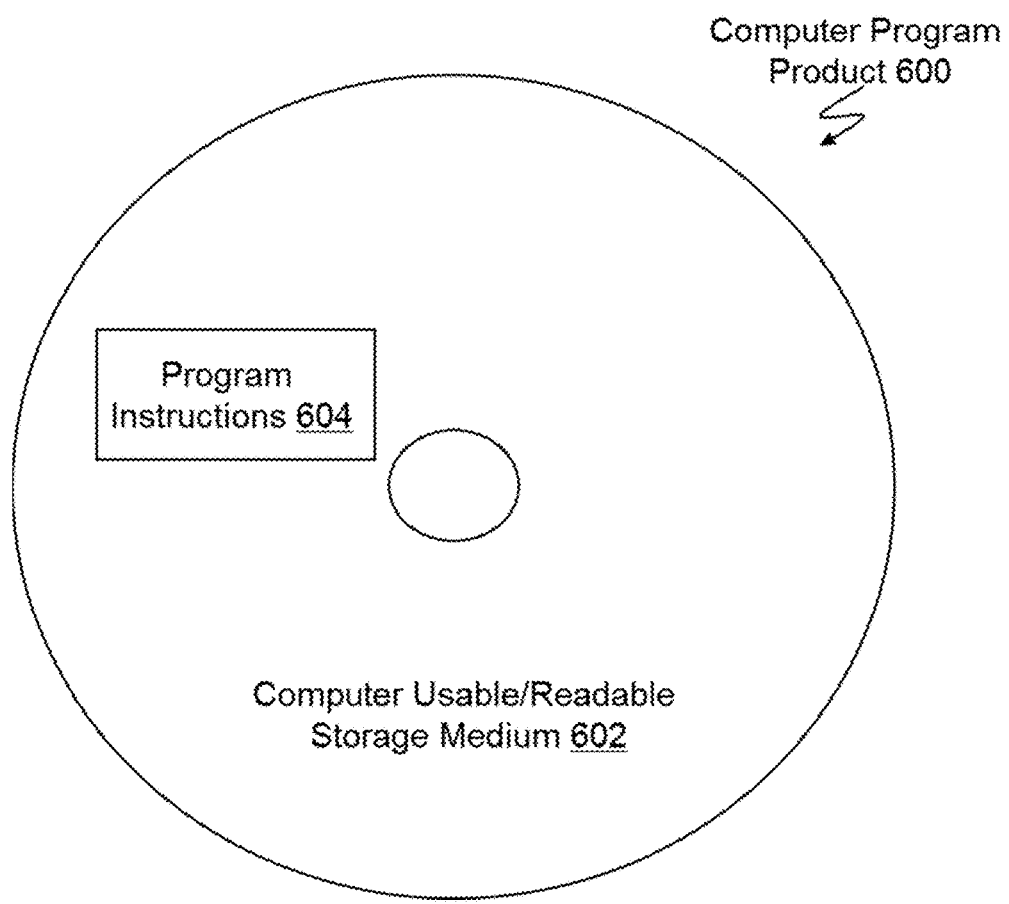

FRAME CHOOSING DURING STORAGE CONSTRAINT CONDITION

CROSS-REFERENCE TO RELATED APPLICATION

This application is a continuation of and claims the benefit of priority to U.S. application Ser. No. 15/457,199 filed on Mar. 13, 2017, which is a continuation application of U.S. application Ser. No. 15/085,484 filed on Mar. 30, 2016 which is a continuation application of U.S. application Ser. No. 14/638,354 filed on Mar. 4, 2015. The entire contents of U.S. application Ser. No. 15/457,199, U.S. application Ser. No. 15/085,484, and U.S. application Ser. No. 14/638,354 are incorporated herein by reference.

BACKGROUND

The present invention relates to frame choosing during a storage constraint condition and, more specifically, to choosing a best frame configuration from remaining frames during a storage constraint condition.

Existing computing systems providing 64 bit addressing (e.g., servers executing certain operating systems) tend to provide "above the bar" virtual storage availability of 16 exabytes (EB), or $2^{64}$ bytes, of data to applications running on the systems. The "bar" here refers to 31 bits of addressing up to 2048 M (2 GB). For 24 address bits, 16 MB is called the "line."

An application's use and reference to this available storage results in the consumption of real storage and auxiliary storage. However, since real storage and auxiliary storage are limited system resources defined by the hardware and paging system configurations, it is often beneficial for an application to balance performance with consumption of these limited system resources.

SUMMARY

According to one embodiment of the present invention, a computing system configured to execute a frame choosing method during a storage constraint condition is provided. The computing system includes a processor, central storage and auxiliary storage. The processor is configured to calculate a use-grouped-threshold, compare a number of available grouped frames that are each provided as a quad frame comprising multiple contiguous 4 k frames to the calculated use-grouped-threshold, return a decision to use a grouped frame in an event that the number of the available grouped frames exceeds the calculated use-grouped-threshold, return a decision to use an above-the-bar frame in an event that the number of the available grouped frames is less than or equal to the calculated use-grouped-threshold, calculate a sum of a number of reserved grouped frames and a number of available above-the-bar frames, wherein the number of reserved grouped frames is an increasable and decreasable percentage of a number of grouped frames in use, count a number of grouped and above-the-bar frames in use, determine whether the number of the grouped and above-the-bar frames in use exceeds a threshold percentage of available frames and take an action in accordance with the determining.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 is a schematic diagram illustrating a computer program product in accordance with embodiments.

DETAILED DESCRIPTION

As will be described below, a method for frame choosing in a computing system during a storage constraint condition is provided and includes calculating a use-grouped-threshold, comparing a number of available grouped frames to the calculated use-grouped-threshold, returning a decision to use a grouped frame in an event that the number of the available grouped frames exceeds the calculated use-grouped-threshold and returning a decision to use an above-the-bar frame in an event that the number of the available grouped frames is less than or equal to the calculated use-grouped-threshold.

Figure 1:
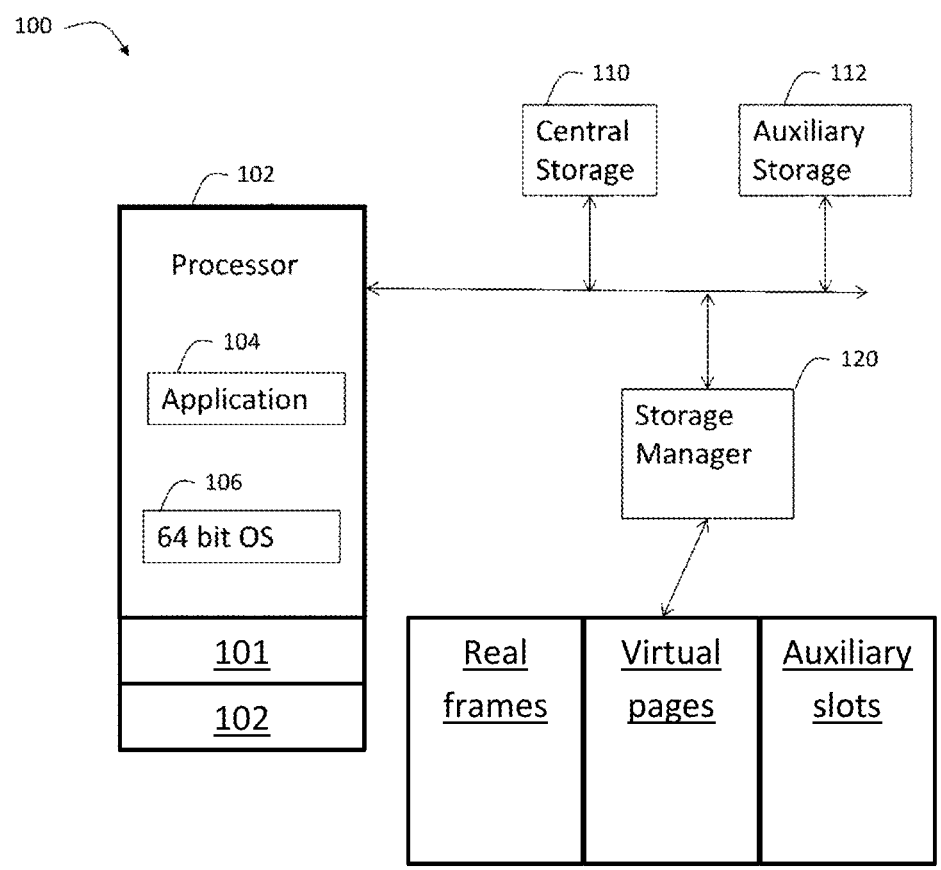
FIG. 1 is a schematic diagram of a computing system in accordance with embodiments.

With reference to FIG. 1, a block diagram of an exemplary computing system 100 is shown. The computing system 100 includes a processor 102, which may be a single processor or a central processor complex having a plurality of processing units. The term "processor" is intended to refer to one or more processing units. The processor 102 may be a part of a server or mainframe employing, e.g., a 64-bit architecture, such as an IBM System z® mainframe and may be a machine executing one or more applications 104 and an operating system 106. As shown illustratively in FIG. 1, the 64-bit architecture provides for above-the-bar virtual storage availability of 16 EB of data to applications running on computing system 100.

The processor 102 interfaces with central storage 110 and auxiliary storage 112. The central storage 110 may be memory that is located on the mainframe of the processor 102 or internal to the mainframe. The auxiliary storage 112 may be physical storage external from the mainframe and may include storage on direct access devices, such as disk drives, and sequential (or serial) access devices, such as tape drives. The central storage 110 may be accessed synchronously with the processor 102 and the auxiliary storage 112 may be accessed asynchronously through input/output (I/O) requests, which are scheduled to run amid other work requests in the system. During an I/O request, the processor 102 is free to execute other, unrelated work.

A storage manager 120 manages the central storage 110 and the auxiliary storage 112. The storage manager 120 may be implemented by the processor 102 or one or more other processors. The storage manager 120 keeps track of the contents of at least the central storage 110 and may manage paging activities (e.g., page-in, page-out and page stealing) and aid with swapping an address space in or out. The storage manager 120 may also use system page data sets to keep track of auxiliary storage slots in the auxiliary storage 112 and may also manage virtual storage by responding to requests to obtain and free virtual storage. The storage manager 120 may keep track of a map of virtual storage for each address space.

As shown in FIG. 1, the storage manager 120 may be configured to manage blocks of the central storage 110, blocks of the auxiliary storage 112 and blocks of virtual storage. The blocks of the central storage 110 are referred to as frames, the blocks of the auxiliary storage 112 are referred to as slots and the blocks of the virtual storage are referred to as pages. The storage manager 120 may be implemented using one or more of multiple storage managers, such as a real storage manager, auxiliary storage manager and virtual storage manager. The term "storage manager" is thus used herein to generically refer to one or more of these devices.

In order for the one or more applications 104 to respectively balance performance versus consumption of the central storage 110 and the auxiliary storage 112, the one or more applications 104 may find a count of one or more of real frames, auxiliary slots and virtual pages being presently consumed beneficial. Therefore, for the one or more applications 104 to manage a range of address space storage, run time availability of a measurement of storage usage is provided by the storage manager 120. The one or more applications 104 can then use the measurement of storage usage to more efficiently manage its data, balancing in storage data with data stored in its own files.

Figure 2:
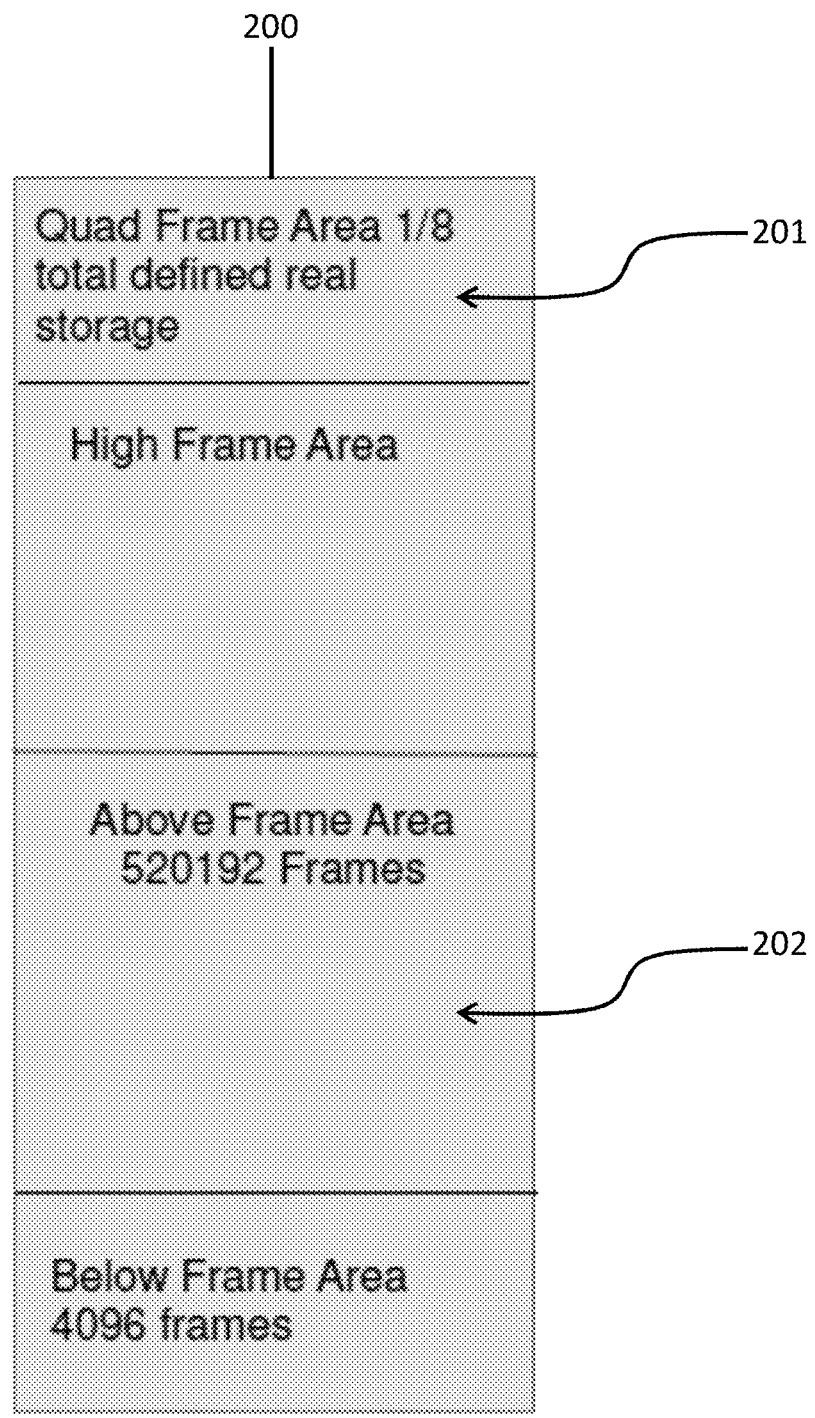
FIG. 2 is a schematic diagram of a storage hierarchy of the computing system of FIG. 1.

With reference to FIG. 2 and with the above general configuration described, it will be understood that the phrase "system memory 200" as used below will refer to the combination of the central storage 110, the auxiliary storage 112 and the virtual storage in the computing system 100 and that system memory 200 frames are not all equal in numbers and significance to the computing system 100. Indeed, various areas of the system memory 200 are assigned for specific uses with certain operating systems using grouped or quad frames 201 to setup data translation tables for virtual storage.

Quad frames 201 are special groups of frames and are each provided as one or more or, in some cases, four contiguous frames at a time with each frame being a 4 k or 4096 byte unit. More generally, grouped frames are special groups of one to three or more contiguous frames. For purposes of clarity and brevity, the following description will relate to the use of quad frames that each have four contiguous frames at a time with each frame being a 4 k or 4096 byte unit but it is to be understood that this is merely exemplary and that other options of frame group size are possible.

The more virtual storage referenced in the computing system 100, the more these quad frames 201 are required to address storage requirements. In accordance with embodiments, the quad frame 201 area may be defined as ⅛ of the real storage of the total system memory 200. When the system memory 200 has plenty of above the 2 GB bar frames, the quad frame 201 area is used only for translation tables and is located as high in the real storage as possible.

With further reference to FIG. 2, another limited storage area that is defined below the 2 GB bar and above the 16 MB line is called the above-the-bar frames 202 area. The above-the-bar frames 202 may be provided in generally limited quantity on the computing system 100 independent of the total real memory from the 16 MB line to the 2 GB bar. The above-the-bar frames 202 are primarily used to back up storage for programs that can only tolerate 31 bit real addresses. When the computing system 100 has used all above 2 GB frame (i.e., the quad frames 201) and is becoming constrained, the allocation of any remaining frames below the 2 GB bar, such as the above-the-bar frames 202, needs to be balanced between the limited quantity of the above-the-bar frames 202 and the special purpose quad frames 201.

If either of these areas runs out of frames before the computing system 100 begins to page out real storage, various operating system components may not get the frame type they need to keep the system running. Thus, a threshold for available quad frames 201 may be set by the computing system 100 as a percentage of the quad groups currently allocated as quad frames 201. Once this threshold is reached, the quad groups are no longer the most desirable frames to use for general frame requests and they revert to being used only for quad group requests. Ideally, as much of the computing system 100 memory as possible will be used before paging while maintaining all computing system 100 functions throughout peak storage use, whether or not the system actually becomes low enough on frames to need paging.

Previous attempts to govern how to insure that as much computing system 100 memory as possible is used before paging occurs have generally involved preserving all of the quad frame 201 area for use only as quad frames 201. However, problems may be encountered as system installed real storage grows, given that the quad area may be ⅛ of the total real storage of the computing system 100. That is, fixed frames will fill high real storage locations and then the 16 MB-2 GB area and the computing system 100 will not pageout high because of the number of frames reserved in the quad area. Meanwhile, if the quad frames 201 are not counted to determine paging, the computing system 100 will page when there are still many real frames going unused. Also, the 16 MB-2 GB area will likely have too many fixed frames and thus cause a pageable storage shortage as well as impacts to other operating system processes that require 31 bit frames.

Other strategies have involved using the quad frames 201 before the above-the-bar frames 202 to avoid the pageable storage shortage situation. This approach avoided the pageable storage shortage noted above-the-bar but caused a thrashing effect in using and reforming quad groups. Requests to reform the quad groups were continually received when the available count reached the threshold. Protecting the quad frames 201 a little bit more by not using them down to the system threshold avoided the thrashing to reform, but caused jobs to hang as they waited for frames when the number of quad frames 201 available was above the paging criteria. This effect was seen on systems where many quad frames 201 were used as quad groups, systems with a high level of referenced virtual storage.

Figure 3:
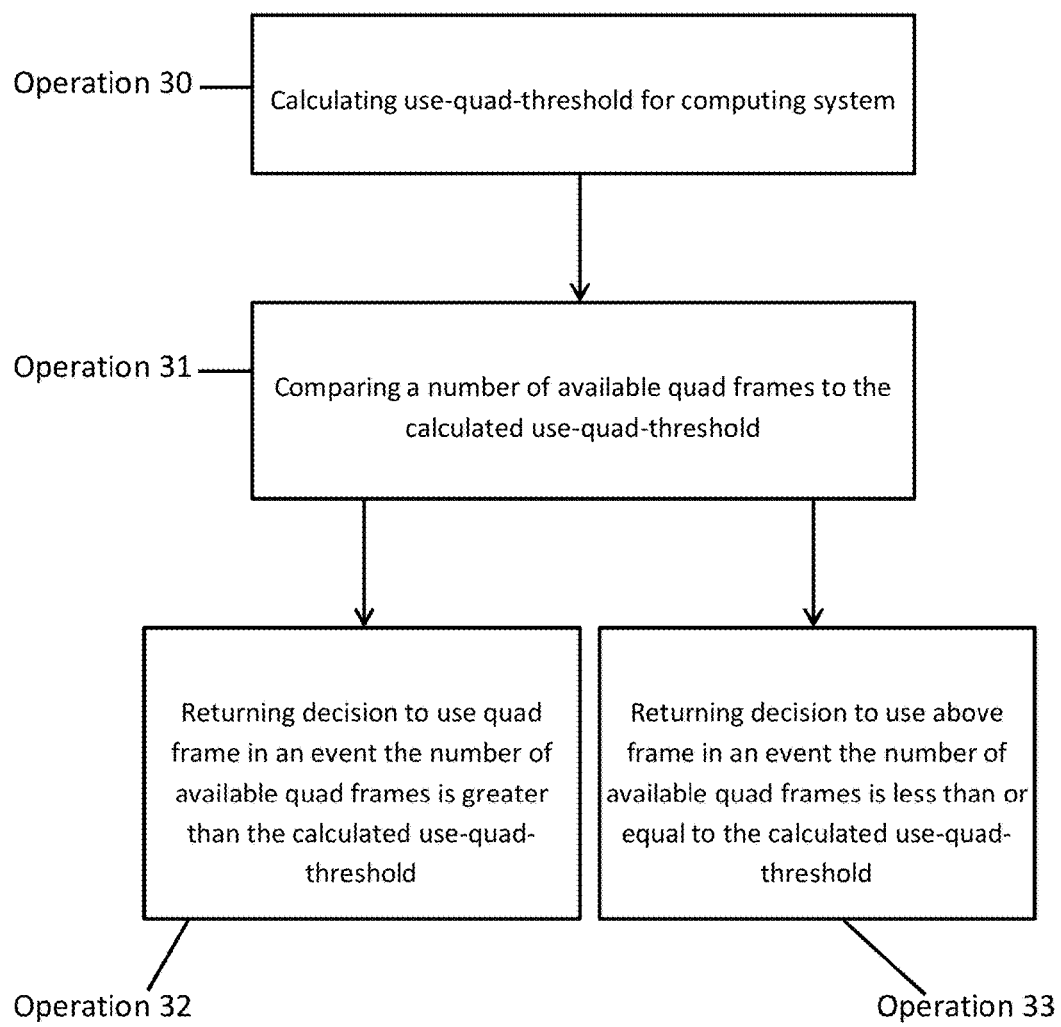
FIG. 3 is a flow diagram illustrating a method of frame choosing during a storage constraint condition in accordance with further embodiments.
Figure 4:
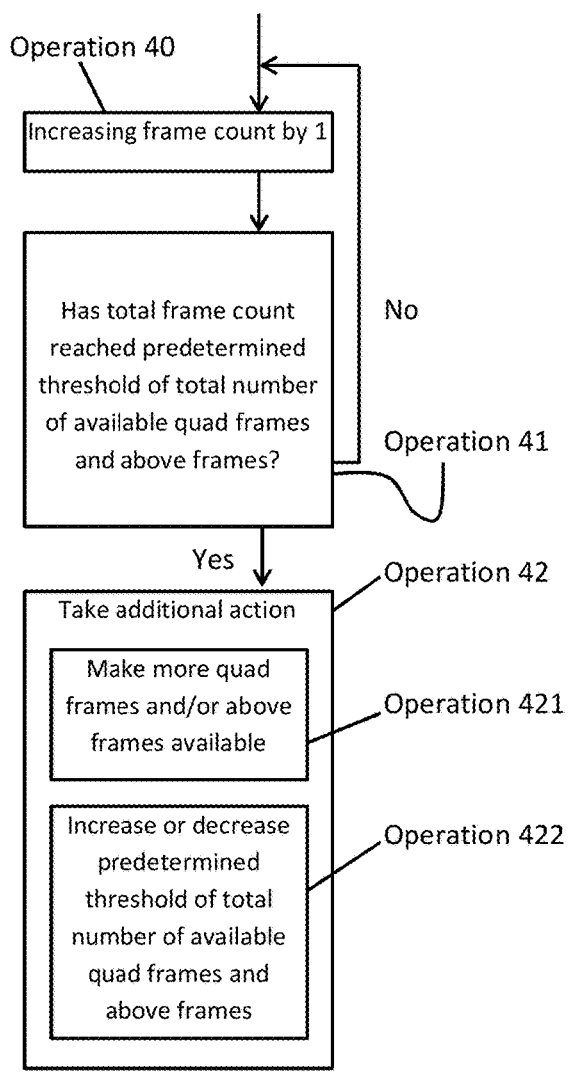
FIG. 4 is a flow diagram illustrating additional actions related to frame choosing in accordance with further embodiments.
Figure 5:
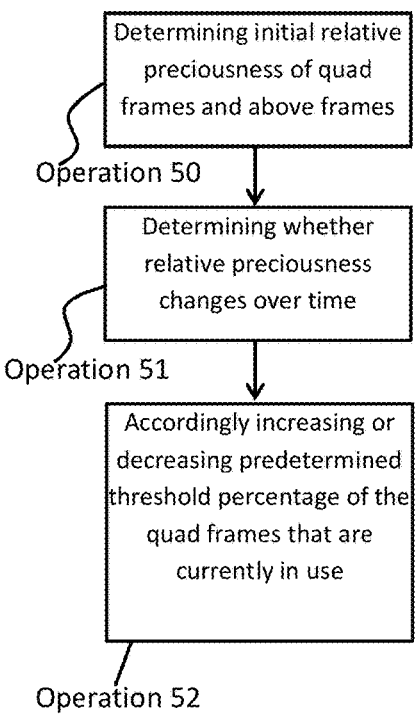
FIG. 5 is a flow diagram illustrating additional actions related to frame choosing in accordance with further embodiments.

With reference to FIGS. 3-5, a method to balance the use of above-the-bar frames 202 and quad frames 201 is provided. In accordance with the method, program data is stored in the high, above/quad and below areas in that order of preference, provided the program can tolerate 64 bit addresses. If a program can only tolerate 31 bit real storage addresses it can only use above-the-bar frames 202 or below frames. If a program can only tolerate 24 bit real addresses it can only use below frames. As program data begins to fill the real storage areas, the computing system 100 could consume all the high area. The next frames to allocate can be above-the-bar frames 202 or quad frames 201. The quad frames 201 have an associated threshold and, if that number of frames is not available, the computing system 100 attempts to make more available by moving program data to other available frames or finding four consecutive frames to form a new group. This processing consumes CPU time which cannot be used by programs to accomplish their tasks.

The computing system 100 also manages a total number of frames to be available at all times. Once the total system threshold is reached, more quad frame 201 and above-the-bar frames 202 can be made available by moving program data to auxiliary storage 112 (i.e., by dumping storage out of real or paging). However, since doing so requires that the input/output (I/O) system operate actively, CPU time is consumed and program performance on the computing system 100 can be slowed down.

With continued reference to FIGS. 3-5, the method can be particularly employed as computing system 100 real usages increase to the point of requiring paging. On larger systems where the quad frame 201 area is well above the 2 GB bar, the quad frames 201 will be favored over the above-the-bar frames 202 up to the point where there are just as many above-the-bar frames 202 as quad frames 201 to satisfy the threshold. Then, the frame usages will alternate as the computing system 100 continues to consume quad frames 201 and above-the-bar frames 202.

As shown in FIG. 3, the method includes calculating a use-quad-threshold for the computing system 100 (operation 30), comparing a number of available quad frames 201 to the calculated use-quad-threshold (operation 31), returning a decision to use a quad frame 201 in an event the number of available quad frames 201 is greater than the calculated use-quad-threshold (operation 32) and returning a decision to use an above-the-bar frame 202 in an event the number of available quad frames 201 is less than or equal to the calculated use-quad-threshold (operation 33). In accordance with embodiments, the calculating of the use-quad-threshold of operation 30 may include equating the use-quad-threshold with the sum of a number of reserved quad frames 201 and a number of available above-the-bar frames 202.

In accordance with further embodiments, the number of the reserved quad frames 201 is based on a predetermined threshold percentage of quad frames 201 that are currently in use. This percentage may be set at about 5%, as an example, such that if there are one hundred quad frames 201 in use, the number of reserved quad frames 201 is five. Thus, if the number of available above-the-bar frames 202 is one hundred, the use-quad-threshold is set at one hundred and five. Using this calculated use-quad-threshold, a decision to use an above-the-bar frame 202 is made if the number of available quad frames 201 is less than or equal to one hundred and five. By contrast, a decision to use a quad frame 201 is made if the number of available quad frames 201 is greater than one hundred and five.

In accordance with further alternative embodiments and, as shown in FIG. 4, once the decision to use a quad frame 201 in operation 32 or a decision to use an above-the-bar frame 202 in operation 33 is made, a counter 101 (see FIG. 1) increases a total frame count of the number of quad frames 201 and the number of above-the-bar frames 202 currently in use by one (operation 40). As the storage usages continue, the counter 101 continues to add to the total frame count as a comparator 102 (see FIG. 1) determines whether the total frame count approaches a predetermined threshold of a total number of available quad frames 201 and above-the-bar frames 202 in the computing system 100 (operation 41). Once the total frame count reaches the predetermined threshold, an additional action is taken (operation 42).

In accordance with some embodiments, the additional action of operation 42 may include making more quad frames 201 and/or above-the-bar frames 202 available (operation 421). This may be achieved by movement of program data to the auxiliary storage 112 (i.e., as part of a storage dump out of real or paging) and may require active I/O operations that could consume CPU time and slow program performance. Also, it is to be understood that the predetermined threshold of the total number of the available quad frames 201 and above-the-bar frames 202 in the computing system 100 may be set as a percentage of the total number of the available quad frames 201 and above-the-bar frames 202 in the computing system 100 to insure that the full usage is generally avoided. However, since there may be cases where full usage is permitted or required (or, alternatively, more strenuously avoided), the additional action of operation 42 may be to increase or decrease the predetermined threshold (operation 422). Thus, where the predetermined threshold is increased, the storage usages will be permitted to continue at least until the total frame count approaches the updated predetermined threshold.

In accordance with still further alternative embodiments, the predetermined threshold percentage of the quad frames 201 that are currently in use may be increased or decreased prior to the execution of operation 30. That is, since the predetermined threshold percentage of the quad frames 201 that are currently in use is set based on a number of factors including, but not limited to, the relative preciousness of the quad frames 201 and the above-the-bar frames 202 to the computing system, a change in the relative preciousness of the quad frames 201 and the above-the-bar frames 202 may require a corresponding change in the predetermined threshold percentage of the quad frames 201 that are currently in use. That is, in an exemplary event that the computing system 100 recognizes that a queue of storage usages suited for above-the-bar frames 202 exists in a storage constraint condition, the computing system 100 may determine that the predetermined threshold percentage of the quad frames 201 that are currently in use should be increased so as to encourage the returning of decisions to use an above-the-bar frame 202 in operation 33.

Thus, as shown in FIG. 5, a determination of an initial relative preciousness of the quad frames 201 and the above-the-bar frames 202 to the computing system 100 is made (operation 50). Subsequently, a secondary determination as to whether the relative preciousness changes over time is made (operation 51) and, if it is determined that such a change has occurred, the predetermined threshold percentage of the quad frames 201 that are currently in use is accordingly increased or decreased (operation 52).

With referring now to FIG. 6, a computer program product 600 is provided and includes a computer readable storage medium 602, which is not a signal, and program instructions 604 for implementing a method of frame choosing in the computing system 100 during a storage constraint condition as described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A frame choosing method, comprising:
   calculating a threshold as a sum of a number of reserved quad frames and a number of available above-the-bar frames;
   comparing a number of available grouped frames provided as one of the reserved quad frames and that comprise contiguous frames to the threshold;
   using a grouped frame if the number of the available grouped frames exceeds the threshold or an above-the-bar frame if the number of the available grouped frames is less than or equal to the threshold;
   calculating a sum of a number of reserved grouped frames defined as a percentage of a number of grouped frames in use and the number of available above-the-bar frames;
   counting the number of reserved grouped and available above-the-bar frames in use and determining whether the number exceeds a threshold percentage of available frames; and
   in accordance with the determining, making more reserved grouped and available above-the-bar frames or increasing the threshold percentage.

* * * * *